Feb. 3, 1970   J. SYLLA   3,493,298
SLIDE VIEWER
Filed Sept. 6, 1967   2 Sheets-Sheet 1
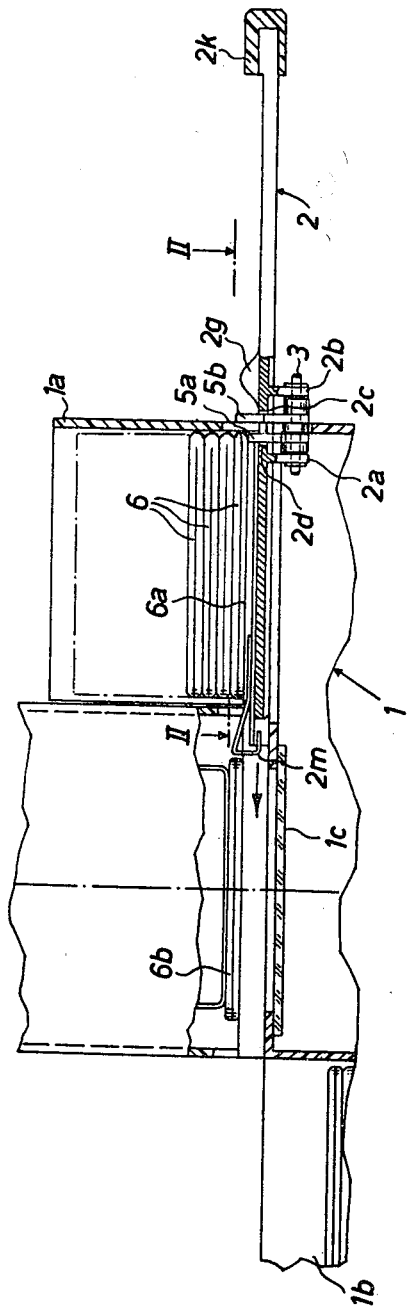
INVENTOR.
JÜRGEN SYLLA
BY Feb. 3, 1970  J. SYLLA  3,493,298
SLIDE VIEWER
Filed Sept. 6, 1967
2 Sheets-Sheet 2
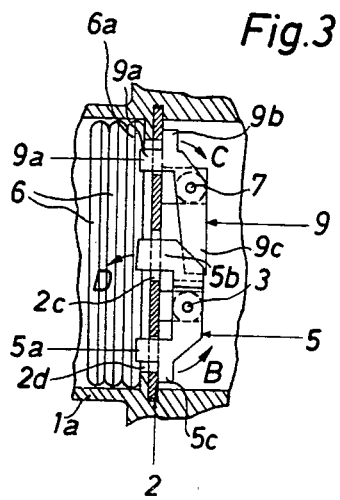
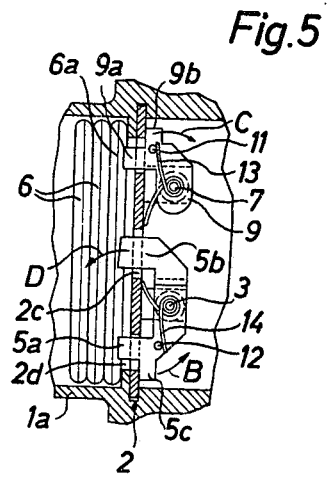
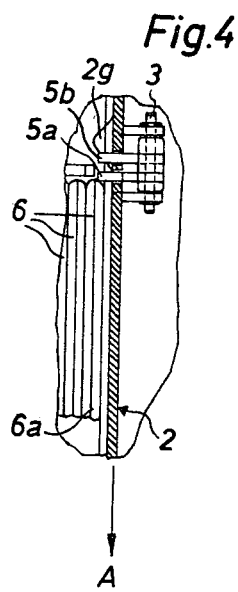
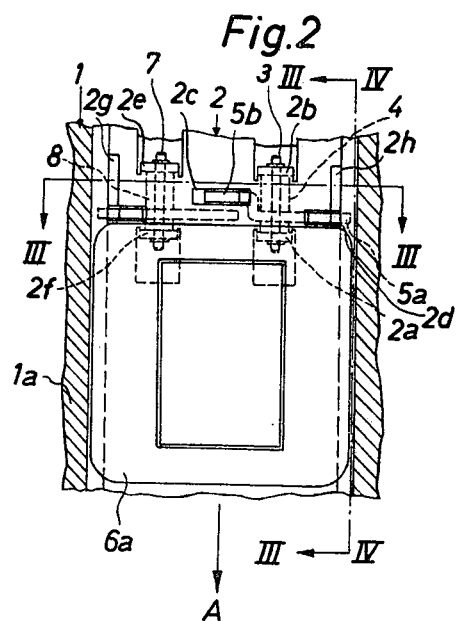
INVENTOR.
JÜRGEN SYLLA
BY United States Patent Office 3,493,298
Patented Feb. 3, 1970

3,493,298
SLIDE VIEWER
Jurgen Sylla, Munich, Germany, assignor to Agfa-Gevaert
Aktiengesellschaft, Leverkusen, Germany
Filed Sept. 6, 1967, Ser. No. 665,760
Claims priority, application Germany, Sept. 10, 1966,
A 53,478
Int. Cl. G03b 23/00, 23/02, 23/04
U.S. Cl. 353—104                                    21 Claims

ABSTRACT OF THE DISCLOSURE

A slide viewer wherein the slide changer moves back and forth along the underside of the lowermost slide in a stack of slides has two upwardly extending pushers including a leading pusher which is capable of entraining relatively thin mounts and a trailing pusher which can be moved upwardly through a distance which suffices to entrain a relatively thick mount with rounded edges. When a rounded edge causes the leading pusher to slide below the lowermost slide, a lever which is pivotally mounted on the slide changer allows the leading pusher to descend and moves the trailing pusher upwardly so that the effective height of the trailing pusher suffices to entrain the mount of the lowermost slide even if such mount has caused the leading pusher to bypass the lowermost slide. The trailing pusher is normally retracted and the leading pusher is normally extended in response to gravity or under the bias of a spring an auxiliary pusher is aligned with the leading pusher. The trailing pusher is disposed midway between but behind the other two pushers.

Background of the invention

The present invention relates to slide viewers, particularly to so-called table viewers which can be equipped with their own source of electrical energy or with a cable to draw current from a conventional outlet. Still more particularly, the invention relates to improvements in slide viewers of the type wherein a reciprocable slide changer automatically transfers successive slides of a stack to projection position and preferably transfers slides from projection position to provide room for fresh slides.

In presently known slide viewers with reciprocable slide changers, that part of the slide changer which transmits motion to a slide cannot be much thicker or higher than the thickness of the flattest slide mount; otherwise, the changer would entrain two or more slides at a time. Since the average thickness of a customary cardboard mount for diapositives is between 0.9 and 1.1 millimeters, the slide changer of a viewer which is used for previewing of slides in flat cardboard mounts cannot be employed for viewing of slides which are held in plastic or metallic mounts having a thickness in the range of 2.2 to 3.5 millimeters. Furthermore, many presently employed plastic or metallic mounts for slides are provided with strongly rounded edges so that a relatively short motion transmitting tooth or ledge of a slide changer for use with customary cardboard slide mounts is bound to slide off the rounded edge of a relatively thick slide mount. Such sliding off is not likely in connection with flat cardboard mounts because the thickness of cardboard mounts does not suffice to provide their marginal portions with pronounced rounded edges.

In purchasing a slide viewer, the buyer must keep in mind the type of slide mounts he or she is employing in order to make sure that the viewer will actually transport the respective type of slides. The manufacturer must produce two types of slide viewers, one for slides with cardboard mounts with an average thickness of 0.9–1.1 millimeters and the other for slides with plastic or metallic mounts with an average thickness of 2.2–3.5 millimeters.

Summary of the invention

It is an object of my invention to provide a novel and improved slide viewer which can be used with all types of slides, irrespective of the thickness of slide mounts and which resets itself automatically when the user shifts from previewing of slides in cardboard mounts to previewing of slides with plastic or metallic mounts or vice versa.

Another object of the invention is to provide a table viewer which can be operated with batteries or with house current and can properly transport slides in mounts with sharp edges as well as slides in mounts with pronounced round edges.

An additional object of my invention is to provide a novel slide changer for use in slide viewers.

A further object of the invention is to provide a slide viewer wherein the slide changer automatically detects the thickness and the outline of marginal portions on slide mounts and adjusts itself to insure proper transportation of slides from a first magazine to projection position and from projection position to a second magazine.

A concomitant object of the invention is to provide a slide changer with a novel set of pushers which transport slides from a magazine into registry with the optical system of a slide viewer.

Still another object of the invention is to provide a slide viewer wherein the slide changer need not occupy more room than a conventional slide changer despite the fact it is susceptible of automatic adjustment for transport of mounts of maximum, minimum or medium thickness.

A further object of the invention is to provide a slide viewer whose slide changer can transport successive slides of a stack wherein slides of different thickness are piled up in random distribution, irrespective of whether the slides of the stack are held in horizontal, vertical or otherwise inclined planes.

The improved slide changer comprises a housing or frame having a portion which preferably resembles a feed chute or magazine and is arranged to accommodate a stack of slides having mounts and including a foremost slide which may be the lowermost slide of the stack, a slide changer movable in the housing between retracted and extended positions and having a side which is adjacent to the foremost slide, and a pair of pushers carried by the slide changer with one thereof located in front of the other pusher—as considered in the direction of movement of the slide changer toward extended position—and normally extending from the side of the slide changer by a distance which suffices to entrain a relatively thin mount on the foremost slide. The one pusher is movable toward the side of the slide changer by a foremost slide whose mount has edges causing the one pusher to travel past such foremost slide while moving with the slide changer toward extended position. The slide viewer further comprises displacing means carried by the slide changer for moving the other pusher away from the side of the slide changer in response to movement of the one pusher toward such side and for placing the other pusher into a position in which the effective height of the other pusher exceeds the aforementioned distance sufficiently to insure that the other pusher entrains the foremost slide in response to movement of the slide changer to extended position. The displacing means can be constituted by a two-armed lever which is pivotable on the slide changer and each arm of which carries one of the pushers. The lever can be urged by gravity or by a spring to assume a position which corresponds to the normal position of the one pusher and in which the effective height of the other pusher need not exceed the maximum distance between the one pusher and the side of the slide changer.

The slide viewer may be provided with an auxiliary pusher carried by the slide changer in alignment with the one pusher and yieldable in response to engagement with the edge of a mount which causes movement of the one pusher toward the side of the slide changer. The auxiliary pusher preferably extends from such side to the same extent as the one pusher and the other pusher is preferably located midway between but behind the two leading pushers.

The novel features which are considered as characteristic of the invention are set forth in particular in the appended claims. The improved slide viewer itself, however, both as to its construction and its mode of operation, together with additional features and advantages thereof, will be best understood upon perusal of the following detailed description of certain specific embodiments with reference to the accompanying drawing.

Brief description of the drawing

FIG. 1 is a fragmentary longitudinal vertical sectional view of a slide viewer which embodies the present invention;

FIG. 2 is a fragmentary horizontal sectional view as seen in the direction of arrows from the line II—II of FIG. 1;

FIG. 3 is a transverse vertical sectional view as seen in the direction of arrows from the line III—III of FIG. 2;

FIG. 4 is a vertical sectional view as seen in the direction of arrows from the line IV—IV of FIG. 2; and FIG. 5 is a transverse vertical sectional view of a portion of a modified slide viewer.

Description of the preferred embodiments

FIG. 1 illustrates a table viewer for slides 6. The viewer comprises a housing or frame 1 having a first magazine or feed chute 1a, a second magazine or collection chute 1b, an optical system 1c located between the chutes 1a, 1b, and a push-pull slide changer 2 which can be manipulated by hand to move the lowermost or foremost slide 6a of the stack in the feed chute 1a into a projection position of registry with the optical system 1c and to simultaneously expel the preceding slide 6b from projection position onto the uppermost slide of the stack in the collection chute 1b. The direction in which the slide changer 2 transports slides from the feed chute 1a toward and into the collection chute 1b is indicated by an arrow A. The leading edge of the slide changer 2 is provided with a motion transmitting member 2m which is movable from the retracted position of FIG. 1 to an extended position to thereby deliver the slide 6b from projection position into the collection chute 1b. The present invention is mainly concerned with such parts of the slide changer 2 which serve to transport successive foremost slides from the feed chute 1a into a projection position of registry with the optical system 1c.

As shown in FIGS. 2 to 4, the slide changer 2 is provided with two downwardly bent lugs 2a, 2b which serve as bearings for a horizontal shaft 3 which is parallel with the direction indicated by the arrow A. The shaft 3 serves as a fulcrum for a two-armed displacing lever 5 which resembles a balance beam and has a sleeve 4 which is rotatable on or with the shaft 3. The ends of the lever 5 are provided with motion transmitting teeth or pushers 5a, 5b which extend through and upwardly beyond slots or cutouts 2d, 2c in the slide changer 2. The lever 5 is further provided with a projection or stop 5c which normally abuts against the underside of the slide changer 2 to thereby limit clockwise turning of the lever as viewed in FIG. 3. In other words, the projection or stop 5c determines the maximum extent to which the pusher 5a can project beyond the slot 2c, namely, beyond the upper side of the slide changer 2. The center of gravity of the lever 5 is located to the right of the axis of the shaft 3, as viewed in FIG. 3, so that the lever tends to turn in a clockwise direction and to maintain the stop 5c in abutment with the underside of the slide changer 2. The pusher 5a is located ahead of the pusher 5b, as considered in the direction of forward movement of the slide changer 2 (arrow A) and, when the slide changer is held in the fully retracted position of FIG. 1 or 2, the leading pusher 5a is adjacent to the edge face on the frame or mount of the lowermost or foremost slide 6a in the feed chute 1a. The effective height of the leading pusher 5a (when the stop 5c abuts against the slide changer 2) is 0.9–1.1 millimeters which is ample to properly engage and transport a customary slide having a cardboard mount with sharply defined edge faces. The effective height of the pusher 5a equals the height of that portion thereof which extends upwardly beyond the slot 2c and into the bottom zone of the feed chute 1a.

When the stop 5c abuts against the slide changer 2, the effective height of the trailing pusher 5b at most equals that of the leading pusher 5a. Thus, the length of that portion of the trailing pusher 5b which extends beyond the slot 2d of the slide changer 2 need not exceed 1.1 millimeters when the displacing lever 5 assumes its normal position by gravity.

The slide changer 2 further carries an auxiliary or secondary tooth or pusher 9a which is provided at one end of a second two-armed lever 9 having a sleeve 8 which is turnable on or with a second shaft 7. The latter is journalled in a bearing constituted by two downwardly extending lugs 2e, 2f of the slide changer 2 and is parallel with the shaft 3. A projection or stop 9b on the one arm of the lever 9 normally abuts against the underside of the slide changer 2. The other arm 9c of the lever 9 constitutes a counterweight and normally maintains the stop 9b in abutment with the underside of the slide changer 2. When the stop 9b assumes the position shown in FIG. 3, the effective height of the auxiliary pusher 9a is the same as that of the leading pusher 5a. FIG. 2 shows that the pushers 5a and 9a are located in a common vertical plane which is normal to the plane of the slide changer 2 and to the direction indicated by arrow A. The pushers 5a, 9a are disposed mirror symmetrically with reference to the central longitudinal plane of the slide changer 2 so that they can engage the lower marginal portion of a slide mount adjacent to the side edges of such mount to insure transport of slides without jamming, tilting or other undesirable movements. The trailing pusher 5b is located substantially midway between but behind the pushers 5a, 9a.

The operation is as follows:

When the operator applies pressure against the handle 2k at the outer end of the slide changer 2 to shift the latter in the direction indicated by arrow A, the pushers 5a and 9a move against the adjacent edge of the mount of the foremost or lowermost slide 6a in the feed chute 1a to transport such slide to the projection position, namely, into the space occupied in FIG. 1 by the slide 6b. The motion transmitting member 2m of the slide changer 2 automatically transfers the slide 6b onto the uppermost slide of the stack in the collection chute 1b. The just described mode of operation will take place if the mount of the slide 6a is relatively thin (up to 2 millimeters) and if the right-hand side face of the mount (as viewed in FIG. 1) is bounded by a sharply defined lower edge which can be properly engaged by the pushers 5a and 9a. The height of the motion transmitting member 2m is preferably such that the latter can transport or push all kinds of slide mounts, irrespective of the thickness and the configuration of marginal portions of such mounts. The freshly transferred slide 6a then registers with a window of the optical system 1c and its image is visible on the screen (not shown).

When the feed chute accommodates a stack of slides with relatively thin mounts having sharply defined edge faces, the trailing pusher 5b is idle, i.e., it merely moves with and lags behind the pushers 5a, 9a but does not perform any work because its effective height is less than or does not exceed the effective height of the pushers 5a and 9a. Such height (when the stop 5c abuts against the underside of the slide changer 2) does not suffice to move the pusher 5b into engagement with the edge face on the mount of the slide which is located directly above the slide 6a of FIG. 1.

However, if the mount of the slide 6a is a relatively thick plastic and/or metallic mount with curved marginal portions (as shown in FIGS. 1, 3 and 4), the leading pusher 5a will engage the mount of the slide 6a at a level below the central horizontal symmetry plane of this slide and will act not unlike a follower which tracks a rounded cam face to thereby rock the displacing lever 5 in a counterclockwise direction (arrow B in FIG. 3) and to move the trailing pusher 5b in the direction indicated by arrow D. The rounded mount of the slide 6a also rocks the lever 9 (arrow C in FIG. 3) so that the pushers 5a, 9a are ineffective and merely travel along the underside of the mount while the slide changer 2 moves in the direction indicated by arrow A. However, rocking of the lever 5 results in increased effective height of the trailing pusher 5b (preferably to between 1.8–2.2 millimeters) so that the latter entrains the mount of the slide 6a and pushes it into registry with the window of the optical system 1c. For example, the effective height of the trailing pusher 5b can increase to 2.2 millimeters which is ample to insure transport of a slide whose mount is provided with strongly rounded edge faces. The change in the effective height of the trailing pusher 5b depends on the dimensions of the displacing lever 5, on the maximum effective height of the leading pusher 5a and on the extent to which the pusher 5a is depressed by the slide 6a.

As shown in FIGS. 2 and 4, the upper side of the slide changer 2 is provided with two roof-shaped lifting protuberances or cams 2g, 2h which are located behind the pushers 5a, 5b, 9a and serve to raise the stack of slides 6 above the slide 6a to prevent jamming while the slide 6a travels toward the optical system 1c. The cams 2g, 2h also serve to raise the stack of slides 6 in the feed chute 1a when the slide changer 2 is caused to move from extended position back to the retracted position of FIG. 1. The cams 2g, 2h are then located ahead of the pushers, as viewed in the direction of movement of the slide changer 2, and maintain the lowermost slide in the chute 1a at a level above the pushers.

Of course, the improved slide viewer is susceptible of many modifications without departing from the spirit of the present invention. Thus, the chutes 1a, 1b need not be vertical. The stack of slides in the chute 1a can be biased against the slide changer 2 by means of one or more leaf springs or the like. The slides of a non-vertical stack can be disposed in vertical planes or in planes which are inclined with reference to a horizontal and with reference to a vertical plane.

The levers 5, 9 can be biased to idle positions by springs 14, 13 shown in FIG. 5. The spring 14 for the lever 5 is a torsion spring which reacts against the slide changer 2 and bears against a post 12 on the lever 5. The springs 13 for the lever 9 is also a torsion spring which reacts against the slide changer 2 and bears against a post 11 of the lever 9.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. A slide viewer, comprising a housing having a portion arranged to accommodate a stack of slides having mounts and including a foremost slide; a slide changer movable in said housing between retracted and extended positions and having a side adjacent to the foremost slide; a pair of pushers carried by said slide changer, one of said pushers being located in front of the other pusher— as considered in the direction of movement of said slide changer toward extended position— and normally extending beyond said side of the slide changer by a distance which suffices to entrain a relatively thin mount of the foremost slide, said one pusher being movable toward said side of the slide changer by a foremost slide whose mount has edges causing the one pusher to travel past such foremost slide while moving with said slide changer toward extended position; and displacing means for moving said other pusher beyond said side of the slide changer to a position in which the effective height of the other pusher exceeds said distance in response to movement of said one pusher toward said one side.

2. A slide viewer as defined in claim 1, further comprising stop means for holding the one pusher against movement with reference to said slide changer beyond said distance.

3. A slide viewer as defined in claim 1, wherein said other pusher normally extends beyond said side of the slide changer by substantially the same distance as said one pusher.

4. A slide viewer as defined in claim 1, wherein said displacing means comprises a balance beam pivotally connected to said slide changer and having two arms each of which carries one of said pushers.

5. A slide viewer as defined in claim 1, wherein said distance is 0.9–1.1 mm.

6. A slide viewer as defined in claim 1, wherein said effective height is 1.8–2.2 mm.

7. A slide viewer as defined in claim 1, wherein said one pusher is arranged to transport slides having cardboard mounts.

8. A slide viewer as defined in claim 1, wherein said other pusher is arranged to transport slides having relatively thick plastic mounts with rounded edges.

9. A slide viewer as defined in claim 1, wherein said one pusher normally extends beyond said side of the slide changer by gravity.

10. A slide viewer as defined in claim 1, wherein said displacing means normally maintains said one pusher at said distance from the side of said slide changer by gravity.

11. A slide viewer as defined in claim 1, further comprising an auxiliary pusher aligned with said one pusher and carried by said slide changer for movement toward and away from said slide of the slide changer, said auxiliary pusher normally extending beyond said side by the same distance as said one pusher and being yieldable toward said side in response to engagement with a rounded edge of the mount of the foremost slide.

12. A slide viewer as defined in claim 11, wherein said auxiliary pusher normally extends from said side by said distance in response to gravity.

13. A slide viewer as defined in claim 11, wherein said auxiliary pusher extends beyond said side by said distance in response to the bias of a spring.

14. A slide viewer as defined in claim 11, wherein said other pusher is located substantially midway between but behind said one pusher and said auxiliary pusher, as considered in the direction of movement of said slide changer from retracted position.

15. A slide viewer as defined in claim 11, further comprising stop means for holding said auxiliary pusher against movement beyond said distance.

16. A slide viewer as defined in claim 11, further comprising a lever pivotally secured to said slide changer and having an arm supporting said auxiliary pusher.

17. A slide viewer as defined in claim 16, wherein said lever comprises a second arm constituting a counterweight to normally maintain said auxiliary pusher at said distance from said side of the slide changer.

18. A slide viewer as defined in claim 1, wherein said portion of the housing is a feed chute which is arranged to maintain the slides in substantially horizontal planes.

19. A slide viewer as defined in claim 18, wherein said slide changer is reciprocable in a substantially horizontal plane and said side is the upper side of said slide changer.

20. A slide viewer as defined in claim 1, further comprising an optical system registering with the foremost slide in response to movement of said slide changer to extended position, said slide changer further comprising motion transmitting means for transporting slides away from registry with said optical system in response to movement of said slide changer to extended position.

21. A slide viewer as defined in claim 1, further comprising spring means for normally maintaining said one pusher at said distance from the side of said slide changer. changer.

References Cited

UNITED STATES PATENTS

| | | | |
|---|---|---|---|
| 1,288,730 | 12/1918 | Stanfield | 353—113 |
| 2,260,660 | 10/1941 | Darwin | 353—104 |
| 2,583,442 | 1/1952 | Parlini et al. | 353—104 |
| 3,273,454 | 9/1966 | Bast | 40—79 XR |
| 3,412,495 | 11/1968 | Zillmer | 40—79 |

NORTON ANSHER, Primary Examiner

ROBERT P. GREINER, Assistant Examiner

U.S. Cl. X.R.

353—113, 114, 116